United States Patent [19]
Hahn

[11] Patent Number: 5,961,244
[45] Date of Patent: Oct. 5, 1999

[54] EXPANSION-JOINT SYSTEM AND BELT

[75] Inventor: Robert B. Hahn, Virginia Beach, Va.

[73] Assignee: The Atlantic Group, Inc., Norfolk, Va.

[21] Appl. No.: 08/948,462

[22] Filed: Oct. 10, 1997

[51] Int. Cl.⁶ .................................................. F16B 3/24
[52] U.S. Cl. ............................................. 403/291; 403/51
[58] Field of Search .................................. 403/50, 51, 23, 403/291; 277/634, 316; 415/174.2, 173.7, 170.1, 214.1; 285/226, 229, 299; 404/65, 67

[56] References Cited

U.S. PATENT DOCUMENTS

| | | | |
|---|---|---|---|
| 1,885,121 | 11/1932 | Loweke | 403/51 |
| 2,405,093 | 7/1946 | Brie | 403/51 |
| 2,712,456 | 7/1955 | McCreery . | |
| 3,368,835 | 2/1968 | Hackforth . | |
| 3,552,776 | 1/1971 | Leymann . | |
| 3,611,816 | 10/1971 | Wedekind | 403/50 |
| 3,669,470 | 6/1972 | Deurloo | 285/266 X |
| 4,186,949 | 2/1980 | Bartha et al. . | |
| 4,289,338 | 9/1981 | Cook . | |
| 4,345,772 | 8/1982 | Woody et al. . | |
| 4,378,176 | 3/1983 | Puccio | 404/69 |
| 4,732,413 | 3/1988 | Bachmann et al. . | |
| 5,159,811 | 11/1992 | Hefler et al. . | |
| 5,228,255 | 7/1993 | Hahn . | |
| 5,716,158 | 2/1998 | Hahn et al. | 285/229 X |

FOREIGN PATENT DOCUMENTS

| | | | |
|---|---|---|---|
| 2479405 | 2/1981 | France | 403/50 |
| 2 488 674 | 2/1982 | France . | |
| 722699 | 1/1955 | Germany | 403/50 |
| 1 253 532 | 11/1967 | Germany . | |
| 1400854 | 3/1968 | Germany | 285/226 |
| 2817126 | 10/1979 | Germany | 285/226 |
| 30 34 742 A1 | 4/1982 | Germany . | |

Primary Examiner—Lynne Reichard
Assistant Examiner—David E. Bochna
Attorney, Agent, or Firm—Griffin, Butler, Whisenhunt & Szipl, LLP

[57] ABSTRACT

An expansion-joint system (48) for forming a seal between a steam turbine and a condenser includes an expansion-joint belt (50, 51) having a width-wise cross-sectional shape with first and second knobs (62, 64) at respective first and second opposite ends (72, 74) of a thinner elongated web (70). The knobs are formed by an abrupt bulge (66, 68) on only a first opposite side, while each of knob portions (76) of a second opposite side of the belt, opposite the bulge, forms a substantially straight line with a lead-in portion (80) from the elongated web. The knob portion and the lead-in portion of the second side are parallel with a symmetrical center (57) of fabric layers (56) in the belt. In one embodiment the substantially straight line formed by the knob portion and lead-in portion of the second side continues over a distance of approximately at least twice the length of the bulge. Clamping mechanisms (52) for clamping onto the first and second knobs each includes a clamping element (84) to be attached to a wall and having and indentation for receiving the bulge, and a clamping bar (88) having a substantially flat surface for mating with the knob portion and lead-in portion of the second side of the joint belt.

11 Claims, 2 Drawing Sheets

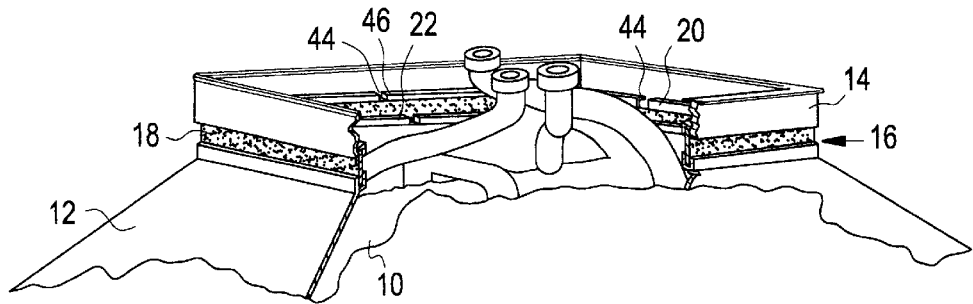
FIG. 1
(PRIOR ART)
FIG. 4
FIG. 5  FIG. 6
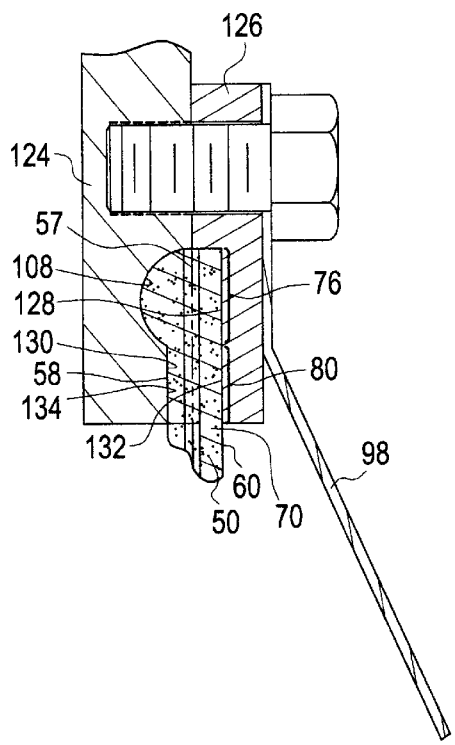
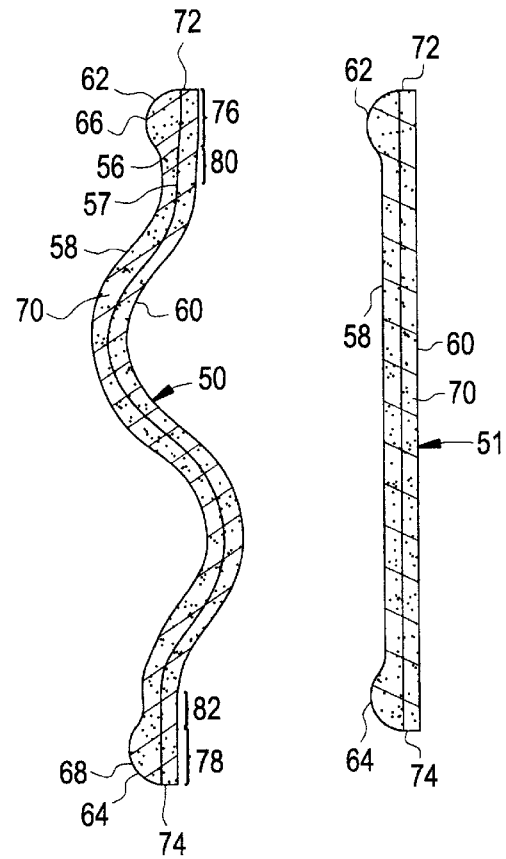
FIG. 7  FIG. 8

U.S. Patent  Oct. 5, 1999  Sheet 2 of 2  5,961,244
FIG. 3
FIG. 2
(PRIOR ART)
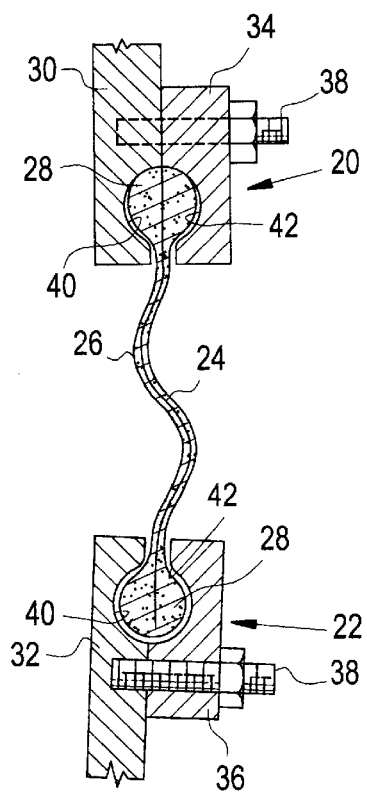
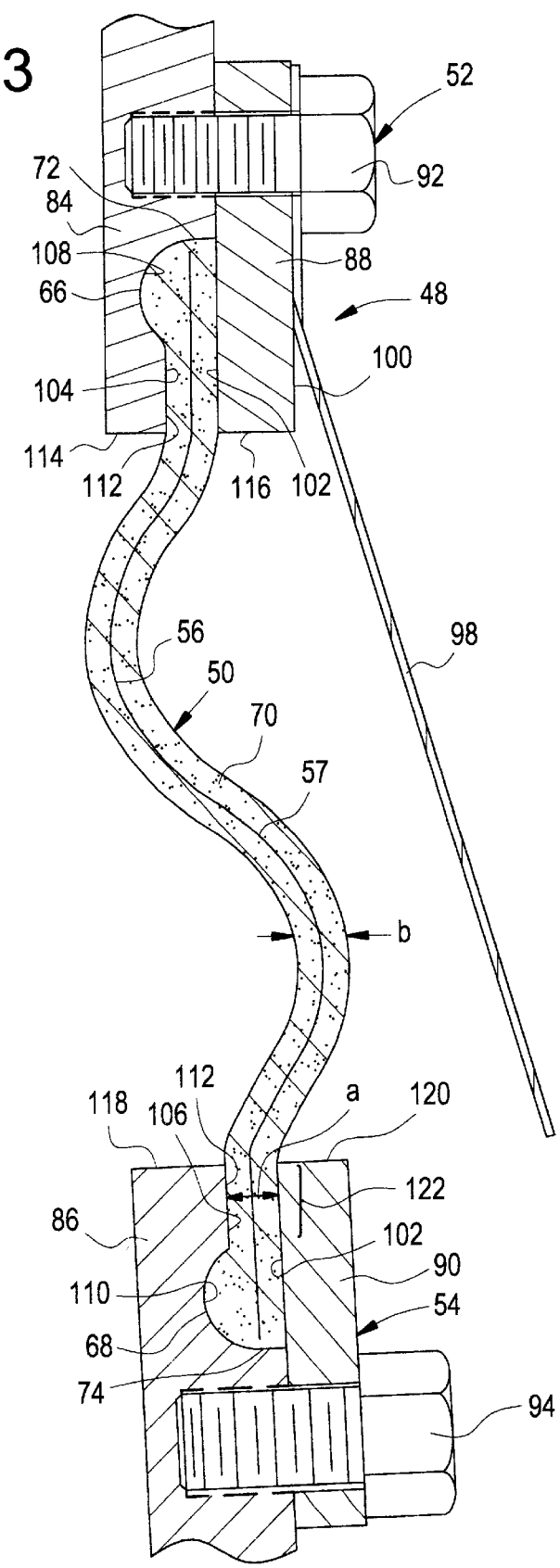

EXPANSION-JOINT SYSTEM AND BELT

BACKGROUND OF THE INVENTION

This invention relates to expansion-joint belts used for sealing between last stages of steam turbines and inlets of condensers for steam-turbine power plants.

A steam turbine power plant often includes a condenser 10 (see FIG. 1) downstream of a last stage 14 of a steam turbine for condensing steam used in the steam turbine. A hood 12 is often attached to the last stage 14 (or a wall attached to the last stage) by an expansion-joint system 16 which includes a resilient belt 18 (although some prior-art belts are also of stainless steel) clamped to the last stage 14 of the steam turbine and the hood 12 of the condenser 10 by a last stage belt clamping mechanism 20 and a condenser belt clamping mechanism 22. A purpose of the resilient belt 18 is to allow relative movement (lateral and longitudinal and axial) between the last stage 14 of the turbine and the hood 12 of the condenser 10, while maintaining a vacuum (which often causes a pressure differential of as much as 15 psi) created in the hood 12 by the condenser 10. Such an expansion-joint system and belt are disclosed in U.S. pat. 5,228,255 to Hahn et al.

It should be understood that the terms "last stage" and "turbine wall", as used herein, include walls attached to the turbine for channeling steam from the turbine. Similarly, the term "condenser hood" includes walls attached to the condenser hood for channeling steam.

Another such expansion-joint system, with belt, is disclosed in U.S. patent application Ser. No. 08/701,330 filed on Aug. 23, 1996 by Robert B. Hahn et al.

These prior-art expansion-joints for use with steam turbines and condensers have normally employed expansion-joint belts of a type depicted generally in FIG. 2 herewith as belt 24 (although the particular version of this type belt depicted in FIG. 2 is a relatively new S-shaped belt, most such prior-art belts being straight in cross section as shown in U.S. Pat. No. 5,228,255 to Hahn et al.). Such prior-art belts have sometimes been referred to as dog-bone belts because they have included a relatively thin elongated web 26 (when viewed in cross-section) with knobs 28 at opposite ends, thereby somewhat resembling a dog-bone. Older versions of these dog-bone belts have included knob cores formed of cords, sometimes of an elastomer, positioned approximately at centers of the knobs 28 (not shown in FIG. 2, but see U.S. Pat. No. 5,288,255 to Hahn et al.).

Each of the last-stage belt clamping mechanisms 20 and the condenser belt clamping mechanisms 22, of these prior-art expansion-joint systems, has an expansion-joint clamping element 30, 32, attached directly or indirectly to a wall of the last stage 14 or the hood 12, and a clamping bar 34, 36, attached to the respective expansion-joint clamping element 30, 32 by bolts 38.

As can be seen in FIG. 2, in such prior-art systems both the expansion-joint clamping elements 30 and 32 and the bars 34 and 36 are machined to have grooves 40 and 42 which generally correspond in shape and size to the shape and size of the knobs 28. Thus, when the clamping bars 34 and 36 are tightly attached to their respective expansion-joint clamping elements 30 and 32, with the respective knobs 28 of the belt 24 in them, they squeeze the knobs 28 between them in their grooves, thereby creating seals between the clamping mechanisms 20 and 22, and the belt 24.

Although these prior-art systems have functioned relatively well, there are a number of problems associated with them. One problem is that it is difficult and expensive to manufacture such a large resilient belt and metallic clamping mechanism with sufficiently exact tolerances that a reliable mechanical seal is created. For this reason, it has even been suggested to provide Zrik fittings on the clamping bars 34 and 36 so that a sealant material can be injected under pressure into cavities formed by the clamping mechanisms 20 and 22 (see U.S. Pat. No. 5,228,255 to Hahn et al.).

A related problem is that it is costly to machine the necessarily accurate grooves 40 and 42 in the clamping elements 30 and 32, and the clamping bars 34 and 36

Yet another related problem is that in these prior-art systems the clamping bars 36 are unduly heavy and therefore difficult to handle. In this respect, because the clamping bars 36 must be machined to create the grooves 42, it is necessary to make them rather thick (1¼ inch) so that they have the necessary strength.

Although the clamping elements 30 and 32 are continuous about mouths of the hood 12 and the last stage 14, the clamping bars 34 and 36 are formed in clamping-bar segments 46 which have breaks 44 (which are exaggerated in FIG. 1 for clarity) between them, as is depicted generally in FIG. 1. The clamping bar segments are usually attached on the steam side of the turbine wall and condenser hood. These clamping-bar segments 46 are made in lengths which can be easily handled by an mechanic. If the linear weight of the clamping-bar segments 46 is unduly great, the clamping-bar segments must be made to have shorter lengths and more clamping-bar segments must be used. An increased number of clamping-bar segments 46 increases costs in manufacturing and installing. Also, an increased number of clamping-bar segments 46 increases the number of gaps 44, which, in turn, detracts from a seal created by the expansion-joint system 16.

It is an object of this invention to provide an expansion-joint system having a belt and hardware which is relatively easy and inexpensive to manufacture, but yet which provides a reliable seal with clamping mechanisms It is a further object of this invention to provide an expansion-joint system having clamping mechanisms which are relatively inexpensive to manufacture and easy to use, yet which reliably hold knobs of the belt.

SUMMARY OF THE INVENTION

According to principles of this invention, an expansion-joint system for forming a seal between a steam turbine and a condenser includes an expansion-joint belt having a widthwise cross-sectional shape with first and second knobs at respective first and second opposite ends of a thinner elongated web, the expansion-joint belt having first and second opposite sides extending between first and second opposite ends of the belt which are parallel at the elongated web. The first and second knobs are formed at the first and second opposite ends by a bulge on only the first opposite side, while a knob portion of the second opposite side forms a substantially straight line with a lead-in portion of the second opposite side leading into the knob portion from the elongated web. In one embodiment, the knob portion of the second opposite side is parallel with a symmetrical center of fabric, such as nylon or polyester, on which the resilient material, such as neoprene rubber, is molded to form the belt. In one embodiment the substantially straight line formed by the lead-in portion of the second opposite side continues a distance along the elongated web substantially equal to that of the knob portion.

The expansion-joint system also includes clamping mechanisms having clamping elements for being attached to relatively moveable walls and clamping bars for being fastened to the clamping elements. The clamping elements include grooves properly shaped and sized to receive the bulges forming the knobs on the first side of the expansion-joint belt while the clamping bars have a substantially flat surfaces for mating with the knob portions and lead-in portions of the second side of the expansion-joint belt. Each of the clamping elements has a flat lead-in surface for being parallel to the flat surface of the clamping bar for clamping on a lead-in portion of the web.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a segmented isometric view of a portion of a condenser for a steam turbine showing a portion of a last stage of the steam turbine, a cutaway condenser hood and a portion of the condenser;

FIG. 2 is a cross-sectional view of a prior-art expansion-joint system for use with a last stage of a steam turbine and a condenser as depicted in FIG. 1;

FIG. 3 is a cross-sectional view of an expansion-joint system of this invention;

FIG. 4 is a segmented cross-sectional view of a portion of a second embodiment of an expansion-joint system of this invention;

FIGS. 5 and 6 are cross-sectional views showing molded shapes-of different embodiments of inventive belts used in expansion-joint systems of this invention; and FIGS. 7 and 8 are cross-sectional views showing representative alternative-embodiment knobs of belts of this invention.

DESCRIPTION OF THE PREFERRED EMBODIMENT

An expansion-joint system 48 (FIG. 3) of this invention includes an expansion-joint belt 50, a last-stage belt clamping mechanism 52, and a condenser belt clamping belt mechanism 54.

The belt 50, shown by itself in FIG. 5. in its molded shape, is constructed as is described in U.S. application Ser. No. 08/701,330, filed Aug. 23, 1996 by Robert B. Hahn et al. Basically, a multi-fabric web carcass 56, having neoprene thereon, is placed between mold halves (not shown) and is then over-molded with neoprene or other rubber materials. As can be seen in the various figures, the fabric 56 has a symmetrical center line 57 which is approximately centered on first and second sides 58 and 60 of the belts 50 and 51. The belts 50 and 51 are substantially similar, with the belt 50 being constructed to have an S-shape in accordance with application No. 08/701,330, filed Aug. 23, 1996 by Robert B. Hahn et al. and the belt 51 being substantially straight as is the belt of U.S. Pat. No. 5,228,255 to Robert B. Hahn et al.

However, it should be noted that the belts 50 and 51 differ from these prior-art belts in that knobs 62 and 64 are formed by bulges 66 and 68 on only the first side 58 thereof. In the depicted, and preferred, embodiment, the bulge is rounded on a radius of approximately ⅜ inch; however, the bulge could have other shapes and still be within the scope of the invention. That is, the first and second sides 58 and 60 of the belts 50 and 51 are parallel throughout a thinner elongated web 70 but the first side 58 bulges at portions of first and second ends 72 and 74 to form the first and second knobs 62 and 64 while knob portions 76 and 78 of the second side 60 at the first and second knobs 62 and 64 form substantially straight lines with lead-in portions 80 and 82 of the second side at the elongated web 70 leading into the first and second knob portions 76, 78 of the second side. It should be noted that in the preferred embodiment the lead-in portions 80 and 82 of the second side are at least approximately as long as the first and second knobs 62 and 64 along the length of the belts 50, 51.

Stated another way, the knob portions 76, 78 of the second side 60 at the first and second knobs 62 and 64 extend parallel to the symmetrical center line 57 of the fabric 56. On the other hand, knob portions on the first side 58 of the belts 50 and 51 bulge away from the symmetrical center line 57 of the fabric 56 to respectively form the bulges 66 and 68.

Describing now in more detail the last-stage belt clamping mechanism 52 and the condenser belt clamping mechanism 54, each of these comprises an expansion-joint clamping element 84, 86 and a clamping bar 88, 90. As in the prior art depicted in FIG. 2, the expansion-joint clamping element 84 is affixed to a duct of the last stage 14 of the steam turbine and the expansion-joint clamping element 86 is affixed to the hood 12 of a condenser unit. The clamping bars 88 and 90 are respectively attached to their expansion-joint clamping elements 84 and 86 by bolts 92 and 94. A ⅛ inch stainless steel shield 98 is also fastened to the last-stage clamping mechanism 52 by the bolts 92, or in some other may, for protecting the belt 50 from internal steam damage.

It should be noted in FIG. 3 that the clamping bars 88 and 90 are substantially rectangular in cross-section. That is, they have flat outer and inner broad sides 100 and 102. On the other hand, the expansion-joint clamping elements 84, 86 have machined notches 104, 106 therein, each notch including an additional groove 108 and 110, for receiving the first and second end portions, at the first and second ends 72 and 74, of the belts 50 and 51. The grooves 108, 110 respectively receive the first and second bulges 66 and 68 of the first and second knobs 62, 64 on the first side of the belt 50, 51; while a lead-in portion 112 of each of the machined notches 104, 106 is straight, or flat, for receiving a lead-in portion of the elongated web 70.

It should be further noted that perimeter edges 114 and 116 of the clamping element 84 and the clamping bar 88 for the last-stage belt clamping mechanism 52 (and perimeter edges 118 and 120 of the clamping element 86 and the clamping bar 90 for the condenser belt clamping mechanism 54) are adjacent one another along the elongated web 70 and that the lead-in portions 112 of the machined notches 104 and 106 are parallel with the inner broad sides 102 of the clamping bars 88 and 90. Further, the machined notches 104 and 106 are dimensioned such that a lead-in spacing "a", between the lead-in portion 112 and the inner broad side 102, of ⁵⁄₁₆ inch is slightly less than a web thickness "b" of ⅜ inch. Thus, a lead-in portion 122 of the web 70 is clamped between parallel flat sides of the expansion-joint clamping element 84 and the clamping bar 88 and between the expansion-joint element 86 and the clamping bar 90. This lead-in portion 122 is approximately as long as the length of the first and second bulges 66 and 68.

FIG. 4 depicts a second embodiment expansion-joint clamping element 124 of this invention which differs from the expansion-joint clamping element 84, 86 in that a clamping bar 126 has a clamping bar notch 128 therein and an expansion-joint clamping element notch 130 is shallower than in the embodiment depicted in FIG. 3. In the FIG. 4 embodiment, an inner broad side surface 132 of the clamping bar contacting knob and lead-in portions 76 and 80 of the second side 60 of the belt 50, 51 is flat and is parallel with a lead-in portion 134 of the clamping-element notch 130. Again, a space between the lead-in portion 134 and the inner broad-side surface 132 is slightly less than the thickness of the elongated web 70. It would be possible to make the clamping bar notch 128 yet deeper still so that the only notch needed in the clamping element is the groove 108.

It will be understood by those of ordinary skill in the art that the clamping bars of this invention, which have flat broad sides rather than grooves, can be manufactured more inexpensively than can prior-art grooved clamping bars. Stated another way, it is significantly less expensive to manufacture only one machined "U" groove than two machined "U" grooves. This cost savings is particularly true in the embodiment of FIG. 3 where the cross-sectional shape of the clamping bar is rectangular, without any notches.

Similarly, molds for manufacturing belts of this invention may be easier, and less expensive, to make than for prior-art belts because the molds need only have grooves on one side. Otherwise, the mold surfaces are maintained approximately parallel to one another, with those mold portions forming the knob portions of the second side, opposite the bulges, and the lead-in portions adjacent the knob forming substantially a straight line (or flat surface). When a belt of the type shown in FIG. 6 is manufactured, the mold portion forming the entire second side of the belt can be a flat surface.

Further, because the clamping bars of this invention need not have high-tolerance machined notches, they can have a lighter linear weight than in the prior art. In this regard, the clamping bars of this invention can be as thin as ½ inch thick, whereas grooved clamping bars of the prior art have been as thick as 1¼ inch. Thus, it is possible for the clamping bar segments 46 of this invention to be longer than those in the prior art while still being easy for installers to handle.

Also, since the clamping bar segments 46 can be longer, there can be fewer breaks 44 between them, which significantly enhances a seal created by an expansion-joint system of this invention.

By making the inner broad sides of the clamping bars flat and parallel to the lead-in portions of the notch on the expansion-joint clamping elements, when the clamping bars are mounted on the expansion-joint clamping elements, the web of the belt is securely and sealingly held in the belt-clamping mechanism, even though there are only single knob bulges on the first side of the belt. In fact, the flat broad sides of the clamping bars actually provide a greater surface area of contact with the belt than did the grooved sides of the prior-art. Because of the complicated nature of the prior-art grooved systems, they tended to have increased contact in localized areas and decreased, or no, contact in other areas. The flat contact of this system provides uniform contact over wide areas.

Because the bulges are on the first side of the belt for engaging the grooves of the clamping elements, the vacuum in the condenser hood, which pulls the belt inwardly, pulls the bulges firmly into the grooves, thereby effectively preventing the knobs from being pulled from the clamping mechanisms and aiding in maintaining pressure differentials of up to, or greater than, 15 psi.

Yet another benefit of the expansion-joint system and belt of this invention is that it is easier to properly seat the belt when it is mounted than it was for prior-art opposite-side bulge belts. That is, in the system of this invention, the broad flat side on the clamping element need not be critically aligned with a bulge, as was necessary in the prior art, since it mates with a flat, straight, portion (knob and lead-in portion) of the second side of the belt. Thus, installation can usually be accomplished by hand without special equipment.

While the invention has been particularly shown and described with reference to a preferred embodiment, it will be understood by those of ordinary skill in the art that various changes in form and detail may be made therein without departing from the spirit and scope of the invention. For example, the knobs could be formed by having the bulge at the first end on the first side and the bulge at the second end on the second side. Also, the bulges need not be rounded but, rather, can have any shape. Several possible additional bulge shapes are depicted in FIGS. 7 and 8.

The invention claimed is:

1. In a resilient expansion-joint belt used for sealing between a steam turbine wall and a condenser hood for allowing lateral and axial relative movement therebetween and having a width-wise cross-sectional shape with first and second knobs at respective first and second opposite ends of a thinner elongated web, said first and second knobs for being respectively engaged by clamping mechanisms which are attached to the turbine wall and condenser hood so that said web extends between said clamping mechanisms for sealing a space between the turbine wall and condenser hood:

the improvement wherein said expansion-joint belt has first and second opposite sides extending between first and second opposite ends of said belt which are substantially parallel at said web, with at least said first knob being formed by an abrupt bulge on only said first opposite side, while a knob portion of said second opposite side, opposite said bulge, forms a substantially straight line with a second-side lead-in portion of said second opposite side leading into said knob portion from said elongated web;

wherein said belt includes a fabric layer running longitudinally of said belt, said fabric layer having a symmetrical center between said first and second opposite parallel sides of said web and extending into said first knob from said web, said knob portion and said second-side being approximately parallel to said symmetrical center of said fabric layer;

wherein said substantially straight line formed by said knob portion and said second-side lead-in portion of said second opposite side continues for a distance of at least approximately twice the length of the bulge and wherein a first-side lead-in portion of said first-side, opposite and parallel to said second-side lead-in portion also forms a substantially straight line extending for a distance of at least approximately the length of the bulge.

2. In an expansion-joint belt as in claim 1 wherein each of said first and second knobs is formed in the same manner.

3. In an expansion-joint belt as in claim 1, wherein said symmetrical center of said fabric layer is approximately centered between said first and second opposite parallel sides of said web.

4. An expansion-joint system for sealing between a steam turbine wall and a condenser hood for thereby forming a steam conduit for conducting steam in a conduit direction, said expansion-joint system including an expansion-joint belt having a width-wise cross-section with first and second knobs at respective first and second opposite ends of a thinner elongated web and having first and second clamping mechanisms for being respectively attached to the steam turbine wall and the condenser hood and clamping onto said first and second knobs of said expansion-joint belt so that said web of said expansion-joint belt extends between said clamping mechanisms for sealing a space between said steam turbine wall and said condenser hood, the improvement wherein:

said expansion-joint belt has first and second opposite sides extending between first and second opposite ends of said belt, with at least said first knob being formed by an abrupt bulge on said first opposite side, while a knob portion of said second opposite side at said first knob forms a substantially straight line with a second-side lead-in portion of said second opposite side leading into said knob portion from said elongated web;

at least said first clamping mechanism includes a clamping element for being attached to one of said steam turbine wall and said condenser hood and a separate clamping bar for being attached to said clamping element in an interior of said steam conduit for thereby squeezing said first knob between said clamping element and said clamping bar wherein said clamping element has an indentation for being directed toward an interior of the steam conduit, said indentation being shaped and sized for receiving almost all of said expansion-joint belt at said first knob including said bulge of said first knob as well as a lead-in portion of said web and wherein said clamping bar comprises a plurality of elongated clamping-bar segments, each segment of said clamping bar forming a substantially planar flat broad surface for engaging the knob portion and the second-side lead-in portion of said second side of said belt, each clamping-bar segment being attached to said clamping element separately and each clamping-bar segment having an entire long side formed as said planar flat broad surface, said clamping-bar segment and its planar flat broad surface being elongated to extend substantially-linearly in a direction perpendicular to the conduit direction.

5. An expansion-joint system as in claim 4 wherein said clamping element has a flat clamping-element lead-in surface substantially parallel to said substantially flat broad surface of each clamping-bar segment attached to said clamping element for engaging a first-side lead-in portion of said web adjacent said bulge.

6. An expansion-joint system as in claim 5 wherein when said clamping-bar segments are attached to said clamping element a clamping gap between said substantially flat broad surface of each of said clamping-bar segments and said clamping-element lead-in surface is slightly smaller than a thickness of said elongated web.

7. An expansion-joint system as in claim 6 wherein the substantially planar flat broad surface of each of said clamping-bar segments contacts a flat surface of said clamping element when said clamping-bar segment is mounted on said clamping element to maintain said clamping gap.

8. An expansion-joint system as in claim 7 wherein a portion of said flat broad surface of each of said clamping-bar segments which contacts said second-side lead-in portion of said belt is coextensive with said flat clamping-element lead-in surface in the conduit direction, these two surfaces lying opposite one another.

9. An expansion-joint system as in claim 4 wherein each of said first and second knobs is formed on said belt in the same manner and each of said first and second clamping mechanisms has substantially the same structure.

10. An expansion-joint system as in claim 4 wherein each said clamping-bar segment is substantially rectangular in a width-wise cross-sectional cut in a plane perpendicular to the steam turbine wall extending in the conduit direction.

11. In a resilient expansion-joint belt used for sealing between a steam turbine wall and a condenser hood for allowing lateral and axial relative movement therebetween and having a width-wise cross-sectional shape with first and second knobs at respective first and second opposite ends of a thinner elongated web, said first and second knobs for being respectively engaged by clamping mechanisms which are attached to the turbine wall and condenser hood so that said web extends between said clamping mechanisms for sealing a space between the turbine wall and condenser hood:

the improvement wherein said expansion-joint belt has first and second opposite sides extending between first and second opposite ends of said belt which are substantially parallel at said web, with at least said first knob being formed by an abrupt bulge on only said first opposite side, while a knob portion of said second opposite side, opposite said bulge, forms a substantially straight line with a second-side lead-in portion of said second opposite side leading into said knob portion from said elongated web;

wherein said belt includes a fabric layer running longitudinally of said belt, said fabric layer having a symmetrical center between said first and second opposite parallel sides of said web and extending into said first knob from said web, said knob portion and said second-side being approximately parallel to said symmetrical center of said fabric layer;

wherein said symmetrical center of said fabric remains parallel with said second opposite side along said belt, from said first end of said belt to said second end of said belt.

* * * * *